US009112425B2

(12) United States Patent
Prescott et al.

(10) Patent No.: US 9,112,425 B2
(45) Date of Patent: Aug. 18, 2015

(54) SWITCH MODE POWER CONVERTER HAVING BURST MODE WITH CURRENT OFFSET

(71) Applicant: Power Integrations, Inc., San Jose, CA (US)

(72) Inventors: Daniel C. Prescott, San Jose, CA (US); Roger Colbeck, Ottawa, CA (US)

(73) Assignee: Power Integrations, Inc., San Jose, CA (US)

( * ) Notice: Subject to any disclaimer, the term of this patent is extended or adjusted under 35 U.S.C. 154(b) by 224 days.

(21) Appl. No.: 13/918,026

(22) Filed: Jun. 14, 2013

(65) Prior Publication Data
US 2014/0369097 A1    Dec. 18, 2014

(51) Int. Cl.
*H02M 1/42* (2007.01)
*H02M 1/00* (2007.01)

(52) U.S. Cl.
CPC .... *H02M 1/4225* (2013.01); *H02M 2001/0025* (2013.01); *H02M 2001/0035* (2013.01); *H02M 2001/0054* (2013.01)

(58) Field of Classification Search
CPC ................. H02M 2001/035; H02M 2001/054; H02M 2001/025; H02M 1/4225; H02M 2001/0035; H02M 2001/0054; H02M 2001/0025

See application file for complete search history.

(56) References Cited

U.S. PATENT DOCUMENTS

| 6,724,174 | B1 * | 4/2004 | Esteves et al. ................. 323/224 |
| 7,116,090 | B1 * | 10/2006 | Yang et al. ..................... 323/288 |
| 8,379,420 | B2 | 2/2013 | Orr |
| 2005/0007088 | A1 * | 1/2005 | Yang et al. ..................... 323/283 |
| 2007/0210772 | A1 * | 9/2007 | Sawtell ........................... 323/282 |
| 2012/0268095 | A1 * | 10/2012 | Wu ................................. 323/285 |

* cited by examiner

*Primary Examiner* — Harry Behm
(74) *Attorney, Agent, or Firm* — Blakely Sokoloff Taylor & Zafman LLP

(57) ABSTRACT

A controller for use in a power converter includes a load sensing circuit coupled to output an error signal in response to a feedback signal representative of an output of the power converter. The error signal is representative of a load coupled to an output of the power converter. A burst mode control circuit is coupled to output a burst mode control signal in response to the error signal. An offset current generator circuit is coupled to output an offset current in response to the error signal. A drive circuit is coupled to control switching of a power switch to control a transfer of energy from an input of the power converter to the output of the power converter in response to the error signal, the burst mode control signal, the offset current, and a current sense signal representative of a current through the power switch.

31 Claims, 5 Drawing Sheets

SWITCH MODE POWER CONVERTER HAVING BURST MODE WITH CURRENT OFFSET

BACKGROUND INFORMATION

1. Field of the Disclosure

The present disclosure relates generally to power converters, and more specifically to controllers for switched mode power converters.

2. Background

Electronic devices use power to operate. Switched mode power converters are commonly used due to their high efficiency, small size and low weight to power many of today's electronics. Conventional wall sockets provide a high voltage alternating current. In a switching power converter a high voltage alternating current (ac) input is converted to provide a well regulated direct current (dc) output through an energy transfer element to a load. In operation, a switch is utilized to provide the desired output by varying the duty cycle (typically the ratio of the ON time of the switch to the total switching period), varying the switching frequency or varying the number of pulses per unit time of the switch in a switched mode power converter.

The switched mode power converter also includes a controller. Output regulation may be achieved by sensing and controlling the output by employing a closed loop feedback topology. The controller may receive a signal representative of the output and the controller varies one or more parameters in response to the signal to regulate the output to a desired target. Properties, such as efficiency, size, weight and cost are usually taken into account when designing a switched mode power converter. The controller may be designed to control the switching rate and frequency of the switched mode power converter to reduce power consumption at no load or low load power conditions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
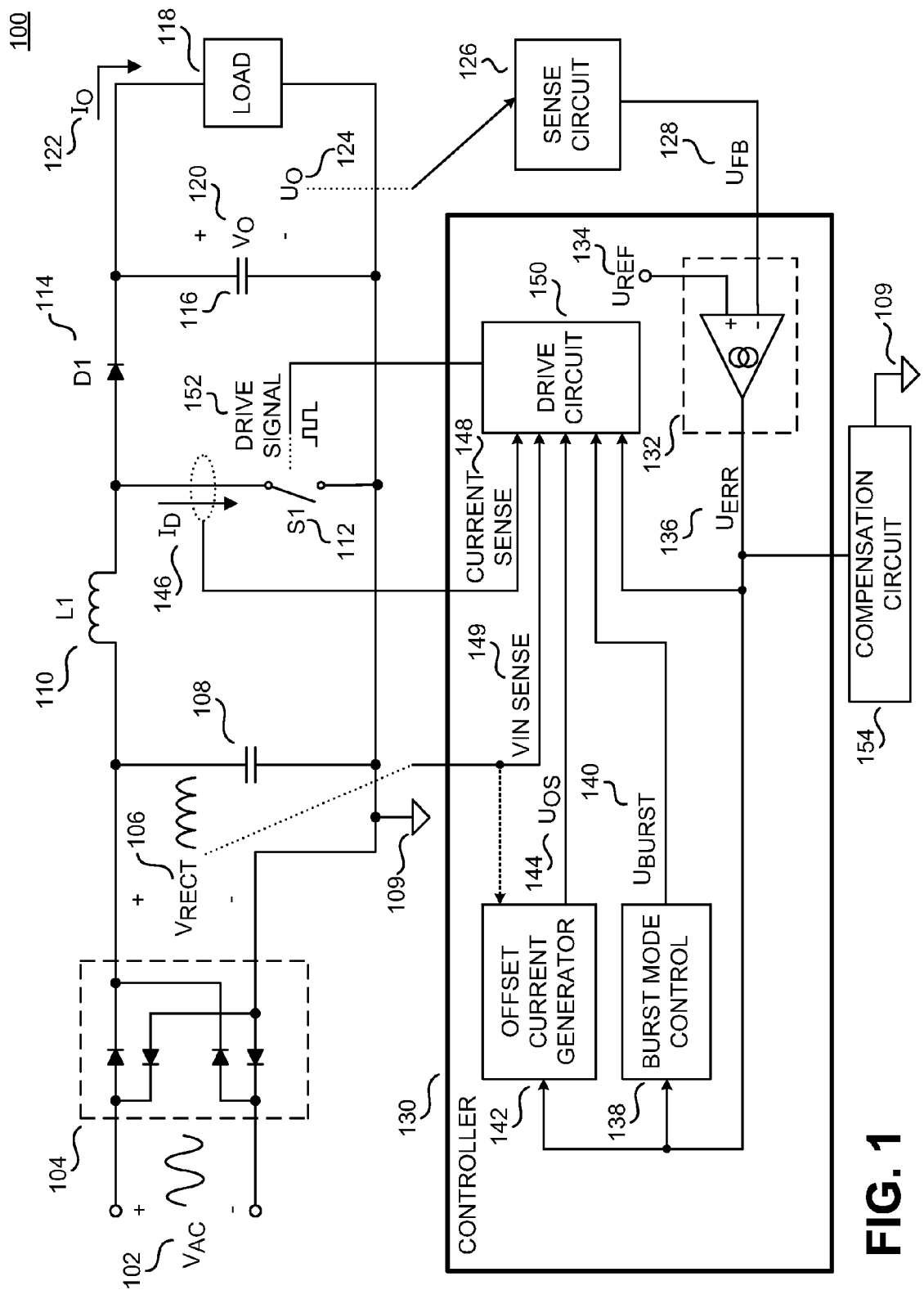
FIG. 1 is a diagram illustrating an example switched mode power converter utilizing a controller in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

A controller may be designed to control the switching of the switched mode power converter to reduce power consumption at no load or low load power conditions. One method for reducing power consumption at no load or low load power conditions may be referred to as burst mode control. During no load or low load power conditions, the controller does not need to continuously turn on and turn off the power switch of the power converter to deliver the required output power. At no load or low load power conditions, the controller may enter burst mode control. During burst mode control, the controller provides output regulation by turning on and turning off the power switch for an interval of time (also referred to as a burst interval) followed by an interval of no switching.

In examples of the present disclosure, the controller utilizes an error signal to determine when to enter burst mode control. The error signal may be representative of the load coupled to the output of the power converter. In one example, the magnitude of the error signal may be directly proportional to the size of the load. If the error signal falls below a burst threshold, the controller may enter burst mode control. However at no load or light load conditions, the magnitude of the error signal may be very small and may be more susceptible to noise. Examples of the present disclosure further include an offset current generator circuit that provides an offset current in response to the error signal. In one example, the offset current may be variable. Further, the offset current may modify power delivery to the output in response to the error signal. For example, the offset current generator circuit provides a proportional offset current when the magnitude of the error signal falls below a threshold. In one example, the offset current is utilized to offset a current sense signal that is representative of a current through the power switch. In one example, the offset current is added to the current sense signal. The current sense signal may be directly proportional to the current through the power switch. As such, the offset current may effectively increase the magnitude of the error signal at given load conditions.

For instance, as will be discussed, an example controller for use in a power converter in accordance with the teachings of the present invention includes a load sensing circuit coupled to output an error signal in response to a feedback signal representative of an output of the power converter. The error signal that is output from the load sensing circuit is representative of a load that is coupled to an output of the power converter. A burst mode control circuit is coupled to output a burst mode control signal in response to the error signal received from the load sensing circuit. An offset current generator circuit is also coupled to receive the error signal that is output from the load sensing circuit. The offset current generator is coupled to output an offset current in response to the error signal. A drive circuit is coupled to control switching of a power switch, which controls a conversion and transfer of energy from an input of the power converter to the output of the power converter in response to the error signal, the burst mode control signal, the offset current, and a current sense signal representative of a current through the power switch.

To illustrate, FIG. 1 shows an example power converter 100 including rectifier 104, an input capacitor 108, an energy transfer element L1 110, a power switch S1 112, an output rectifier D1 114, an output capacitor 116, an output sense circuit 126, a switched mode controller 130, and a compensation circuit 154. Controller 130 further includes a load sensing circuit 132, burst mode control circuit 138, offset current generator 142, and drive circuit 150. FIG. 1 further illustrates an input ac voltage $V_{AC}$ 102, a rectified voltage $V_{RECT}$ 106, a load 118, an output voltage $V_O$ 120, an output current $I_O$ 122, an output quantity $U_O$ 124, a feedback signal $U_{FB}$ 128, a reference signal $U_{REF}$ 134, an error signal $U_{ERR}$ 136, a burst signal $U_{BURST}$ 140, an offset signal $U_{OS}$ 144, a switch current $I_D$ 146, a current sense signal 148, an input voltage sense signal 149, and a drive signal 152. The example power converter 100 illustrated in FIG. 1 is coupled in a boost configuration, which is just one example of a switched mode power converter that may benefit from the teachings of the present invention. In one example, the example power converter 100 of FIG. 1 may be utilized as a power factor correction (PFC) converter. It is appreciated that other known topologies and configurations of switched mode power converter may also benefit from the teachings of the present invention.

In the illustrated example, the power converter 100 provides output power to the load 118 from an unregulated input voltage. In one example, the input voltage is the ac input voltage $V_{AC}$ 102. The ac input voltage $V_{AC}$ 102 may be an ac line voltage, which can be provided from a conventional wall outlet. In another example, the input voltage is a rectified ac input voltage such as the rectified voltage $V_{RECT}$ 106. As shown, the rectifier 104 receives an ac input voltage $V_{AC}$ 102 and produces a rectified voltage $V_{RECT}$ 106. In the example shown, input capacitor 108 is coupled across the output of rectifier 104 and may filter high frequency current through the power switch S1 112. For some applications, the value of the input capacitor 104 may be large enough such that a substantially dc voltage is applied to the energy transfer element L1 114. However, for power converters utilized in power factor correction (PFC), the value of the input capacitor 108 is small and the input capacitor 108 may be utilized to allow the voltage applied to the energy transfer element L1 110 to substantially follow the rectified voltage $V_{RECT}$ 106.

In the example shown, energy transfer element L1 110, power switch S1 112, and rectifier D1 114 are coupled together in a boost converter configuration. The bridge rectifier 104 is coupled to one end of energy transfer element L1 110. In one example, the energy transfer element L1 110 is an inductor. The other end of energy transfer element L1 110 is further coupled to the power switch S1 112 and the output rectifier D1 114, which is exemplified as a diode in FIG. 1. However, in some examples, the output rectifier D1 114 may be a transistor used as a synchronous rectifier. As illustrated, one end of power switch S1 112 is coupled between the energy transfer element L1 110 and the output rectifier D1 114 while the other end of power switch S1 112 is coupled to input return 109. Output capacitor 116 is shown as coupled to both the power switch S1 112 and the output rectifier D1 114. Load 118 is coupled across the output capacitor 116. An output is provided to the load 118 and may be provided as either an output voltage $V_O$ 120, an output current $I_O$ 122, or a combination of the two.

As shown in the depicted example, power converter 100 further includes circuitry to regulate the output, which is exemplified as output quantity $U_O$ 124. An output sense circuit 126 is coupled to sense the output quantity $U_O$ 124 and to provide feedback signal $U_{FB}$ 128, which is representative of the output quantity $U_O$ 124. Feedback signal $U_{FB}$ 128 may be voltage signal or a current signal.

In the example shown in FIG. 1, controller 130 is coupled to the output sense circuit 126 and receives the feedback signal $U_{FB}$ 128 from the output sense circuit 126. The controller 130 is further coupled to receive the current sense signal 148 and is coupled to provide the drive signal 152 to power switch S1 112. The current sense signal 148 may be representative of the switch current $I_D$ 146 through power switch S1 112. Current sense signal 148 may be a voltage signal or a current signal. In one example, controller 130 may also be coupled to receive an input voltage sense signal VIN SENSE 149. Input voltage sense signal 149 may be representative of an input voltage of the power converter 100. In a few examples, input voltage sense signal 149 may be representative of the rectified voltage $V_{RECT}$ 106, the voltage across capacitor 108, or the ac input voltage $V_{AC}$ 102. Input voltage sense signal 149 may be a voltage signal or a current signal. In addition, the controller 130 provides drive signal 152 to the power switch S1 112 to control various switching parameters to control the transfer of energy from the input of power converter 100 to the output of power converter 100. Examples of such parameters may include switching frequency, switching period, duty cycle, or respective ON and OFF times of the power switch S1 112.

As illustrated in FIG. 1, the controller 130 includes load sensing circuit 132, burst mode control circuit 138, offset current generator 142, and drive circuit 150. The load sensing circuit 132 is coupled to receive the feedback signal $U_{FB}$ 128 and outputs the error signal $U_{ERR}$ 136 in response to the feedback signal $U_{FB}$ 128. In one example, the error signal $U_{ERR}$ 136 is representative of the load 118 coupled to the output of the power converter 100 and may be a voltage signal or a current signal. The error signal $U_{ERR}$ 136 may be directly proportional to the load 118. In other words, a larger error signal $U_{ERR}$ 136 may correspond to a larger load 118. In another example, the error signal $U_{ERR}$ 136 may be decreasingly proportional to the load 118. In other words, a smaller error signal $U_{ERR}$ 136 may correspond to a larger load 118. Further, the relationship between the error signal $U_{ERR}$ 136 and the load 118 may be linear or non-linear. In another example, the error signal $U_{ERR}$ 136 is representative of the output power provided to the load 118. An error amplifier may be one example of the load sensing circuit 132. As illustrated in the example depicted in FIG. 1, the load sensing circuit 132 may be a transconductance amplifier.

In one example, compensation circuit 154, which is shown external to the controller 130 in the depicted illustration, is coupled to receive the error signal $U_{ERR}$ 136. The compensation circuit 154 is further shown coupled to input return 109. In one example, the compensation circuit 154 provides loop compensation for the feedback loop of the power converter 100. Further, the compensation circuit 154 may slow down the response time of the feedback loop.

As shown in the depicted example, burst mode control circuit 138, offset current generator 142, and drive circuit 150 are also coupled to receive the error signal $U_{ERR}$ 136 from the load sensing circuit 132. In one example, the burst mode control circuit 138 outputs the burst signal $U_{BURST}$ 140 in response to the error signal $U_{ERR}$ 136. The burst signal $U_{BURST}$ 140 is coupled to cause the controller 130 to operate in a burst mode of operation and may be a voltage signal or a current signal. In one example, the burst signal $U_{BURST}$ 140 is a rectangular pulse waveform with varying lengths of logic high and logic low sections. As will be further discussed, the burst mode control circuit 138 is coupled to receive the error signal $U_{ERR}$ 136 and a burst threshold. In one example, the burst signal $U_{BURST}$ 140 indicates that the controller 130 should operate in burst mode when the error signal $U_{ERR}$ 136 is less than the burst threshold.

Offset current generator 142 outputs the offset signal $U_{OS}$ 144 in response to the error signal $U_{ERR}$ 136. In one example, the offset signal $U_{OS}$ 144 is added to the current sense signal 148, which is representative of the switch current $I_D$ 146. In one example, the current sense signal 148 may be a current signal or a voltage signal. As will be further discussed, in one example, the offset signal $U_{OS}$ 144 is substantially zero when the error signal $U_{ERR}$ 136 is greater than a first threshold. In one example, the offset signal $U_{OS}$ 144 is a non-zero value when the error signal $U_{ERR}$ 136 is less than the first threshold. For instance, the offset signal $U_{OS}$ 144 may increase as the error signal $U_{ERR}$ 136 decreases from the first threshold. Optionally, the offset current generator 142 may also receive the input voltage sense signal 149 (as shown by the dashed arrow). The offset current generator 142 may also be responsive to the input voltage sense signal 149. In one example, the input voltage sense signal 149 may provide a scaling factor for the outputted offset signal $U_{OS}$ 144. For example, the input voltage sense signal 149 may provide information that the input voltage is in low-line conditions or high-line conditions. During high-line conditions, the offset signal offset signal $U_{OS}$ 144 may increase as the error signal $U_{ERR}$ 136 decreases from the first threshold at a faster rate than in low-line conditions of the input voltage. In another example, the first threshold may also be dependent on the value of the input voltage sense signal 149.

Drive circuit 150 is further coupled to receive the offset signal $U_{OS}$ 144 and the burst signal $U_{BURST}$ 140 along with the error signal $U_{ERR}$ 136 and the current sense signal 148. The drive circuit 150 outputs the drive signal 152 to control switching of the power switch S1 112 in response to the error signal $U_{ERR}$ 136, burst signal $U_{BURST}$ 140, offset signal $U_{OS}$ 144 and the current sense signal 148. In one example, drive signal 152 is a rectangular pulse waveform with varying lengths of logic high and logic low sections. In addition, the time between rising edges of the drive signal 152 is substantially equal to the switching period $T_S$ of the power converter 100. It is generally understood that a switch that is closed may conduct current and is considered on, while a switch that is open cannot conduct current and is considered off. In one example, the power switch S1 112 may be a transistor such as a metal-oxide-semiconductor field-effect transistor (MOSFET). In another example, controller 130 may be implemented as a monolithic integrated circuit or may be implemented with discrete electrical components or a combination of discrete and integrated components. In one example, controller 130 and power switch S1 112 could form part of an integrated circuit that is manufactured as either a hybrid or a monolithic integrated circuit.

During no load or low load power conditions, the controller 130 may reduce average power consumption by operating in burst mode. During burst mode control, the controller provides output regulation by turning on and turning off the power switch S1 112 for an interval of time (also referred to as a burst interval) followed by an interval of no switching. Examples of the present disclosure utilize the error signal $U_{ERR}$ 136 to determine when the controller 130 should operate in burst mode control. As will be discussed, in one example, the controller 130 operates in burst mode control when the error signal $U_{ERR}$ 136 is less than a burst threshold since the error signal $U_{ERR}$ 136 is representative of the load 118. However, at no load or light load conditions, the magnitude of the error signal may be very small and may therefore be more susceptible to noise. In addition, examples in accordance with the teachings of the present invention further include adding the offset signal $U_{OS}$ 144 to the current sense signal 148, which is representative of the switch current $I_D$ 148. The added offset signal $U_{OS}$ 144 may reduce the noise susceptibility of the error signal $U_{ERR}$ 136 and/or current sense signal 148 in accordance with the teachings of the present invention.

Figure 2:
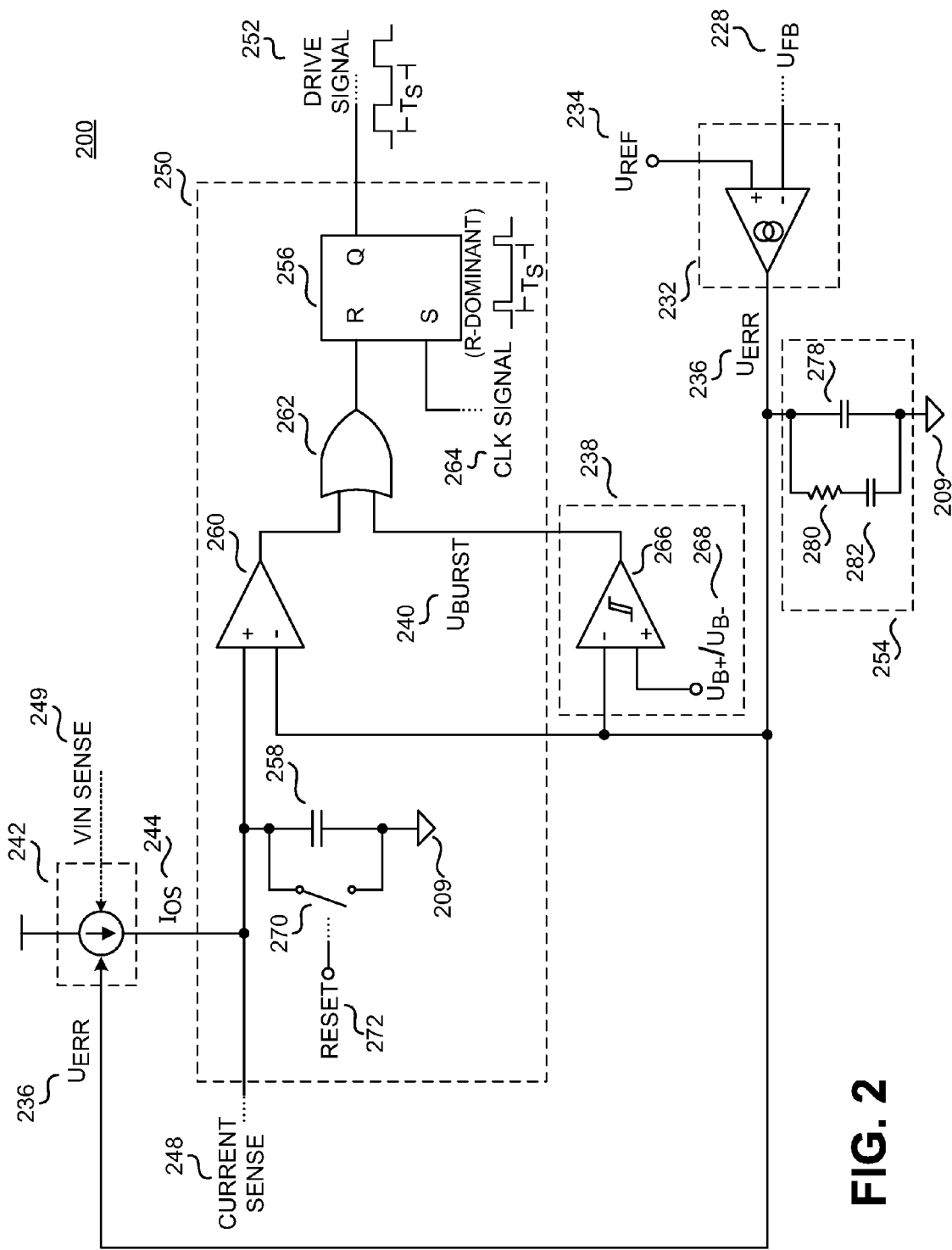
FIG. 2 is a diagram illustrating one example of the controller of FIG. 1 in accordance with the teachings of the present invention.

FIG. 2 illustrates an example controller 200, which in one example may be controller 130 of FIG. 1. It should be appreciated that similarly named and numbered elements referenced below are coupled and function as described above. In the depicted example, controller 200 is shown including load sensing circuit 232, burst mode control circuit 238, offset current generator 242, and drive circuit 250. Further shown in FIG. 2 is the compensation network 254.

As mentioned above, load sensing circuit 232 is coupled to receive the feedback signal $U_{FB}$ 228. As illustrated, the load sensing circuit 232 also receives a reference signal $U_{REF}$ 234. Reference signal $U_{REF}$ 234 may be a voltage signal or a current signal. The load sensing circuit 232 outputs the error signal $U_{ERR}$ 236 in response to the feedback signal $U_{FB}$ 228 and the reference signal $U_{REF}$ 234. In the example shown, the load sensing circuit 232 is a transconductance amplifier. The non-inverting input of the transconductance amplifier is coupled to receive the reference signal $U_{REF}$ 234 while the inverting input is coupled to receive the feedback signal $U_{FB}$ 228. The output of the transconductance amplifier is the error signal $U_{ERR}$ 236. In the depicted example, error signal $U_{ERR}$ 236 is representative of a load that is coupled to the output of a power converter including controller 200.

As shown in the example depicted in FIG. 2, the output of the load sensing circuit 232 is coupled to the compensation network 254. In one example, the compensation circuit 254 includes capacitances 278 and 283, and resistance 280. In the example, resistance 280 and capacitance 278 are coupled to the output of the load sensing circuit 232. In addition, resistance 280 and capacitance 282 are coupled together in series while capacitance 278 is coupled in parallel with resistance 280 and capacitance 282. As shown, capacitances 278 and 282 are coupled to input return 209. In one example, the compensation circuit 254 provides closed loop phase compensation for the feedback loop of the power converter. Further, the compensation circuit 254 may slow down the response time of the feedback loop to provide stability of operation.

As illustrated, the error signal $U_{ERR}$ 236 is also coupled to be received by the burst mode control circuit 238, offset current generator 242, and drive circuit 250. In one example, the burst mode control circuit 238 includes a comparator 266. In the illustrated example, the inverting input of comparator 266 is coupled to receive the error signal $U_{ERR}$ 236 while the non-inverting input of comparator 266 is coupled to receive the burst threshold 268. The output of comparator 266 is the burst signal $U_{BURST}$ 240. In the illustrated example, the comparator 266 is a hysteretic comparator, which is coupled to provide a hysteretic comparison such that the value of the burst threshold may therefore in one example be either an upper burst threshold $U_{B+}$ or a lower burst threshold $U_{B-}$. It should be appreciated that the magnitude of the upper burst threshold $U_{B+}$ is greater than the magnitude of the lower burst threshold $U_{B-}$.

In operation, the burst threshold 268 in one example is initially set to the lower burst threshold $U_{B-}$. The burst signal $U_{BURST}$ 240 transitions to a logic high value when the error signal $U_{ERR}$ 236 falls below the lower burst threshold $U_{B-}$. Once the error signal $U_{ERR}$ 236 falls below the lower burst threshold, the burst threshold 268 is then set to the upper burst threshold $U_{B+}$. The burst signal $U_{BURST}$ 240 does not transition to a logic low value until the error signal $U_{ERR}$ 236 is greater than the upper burst threshold $U_{B+}$. The burst signal $U_{BURST}$ 240 is output to the drive circuit 250. In the example shown, the burst signal $U_{BURST}$ 240 is coupled to be received by an input of OR gate 262. As will be further discussed, the burst mode control signal $U_{BURST}$ 240 is coupled to cause the controller 200 to operate in a burst mode of operation. Optionally, the burst mode control circuit 238 may be responsive to the input voltage sense signal 249. In one example, the magnitude of the lower burst threshold $U_{B-}$ and the upper burst threshold $U_{B+}$ may be responsive to the value of the input voltage sense signal 249.

The offset current generator 242 is shown in the depicted example including a controlled current source, which is coupled to be responsive to the error signal $U_{ERR}$ 236. The controlled current source generates the offset current $I_{OS}$ 244 in response to the error signal $U_{ERR}$ 236. The relationship between the error signal $U_{ERR}$ 236 and the offset current $I_{OS}$ 244 will be further discussed with respect to FIGS. 3A and 3B. In one example, the offset current $I_{OS}$ 244 is substantially zero if the error signal $U_{ERR}$ 236 is greater than a first threshold, which is illustrated as $U_{TH1}$ in FIGS. 3A and 3B. In the example, the offset current $I_{OS}$ 244 is non-zero when the error signal $U_{ERR}$ 236 is less than the first threshold $U_{TH1}$. In one example, the offset current $I_{OS}$ 244 may increase as the error signal $U_{ERR}$ 236 decreases from the first threshold $U_{TH1}$. In one example the offset current $I_{OS}$ 244 may be a constant value for some value ranges of the error signal $U_{ERR}$ 236 while the offset current $I_{OS}$ 244 may be variable for other value ranges of the error signal $U_{ERR}$ 236. As shown in the illustrated example, offset current $I_{OS}$ 244 may be output to the drive circuit 250. In the example shown, the offset current is coupled to capacitor 258 and comparator 260. Further, the controlled current source may optionally be coupled to be responsive to the input voltage sense signal 249. In one example the input voltage sense signal 249 may scale the outputted offset current $I_{OS}$ 244. For example, under high-line input voltage conditions, the outputted offset current $I_{OS}$ 244 may be higher than low-line input voltage conditions for the same value for the error signal $U_{ERR}$ 236. In addition, the magnitude of the first threshold $U_{TH1}$ may also be responsive to the value of the input voltage sense signal 249.

In the depicted example, drive circuit 250 is coupled to receive the error signal $U_{ERR}$ 236, burst signal $U_{BURST}$ 240, current sense signal 248 and offset current $I_{OS}$ 244. In the example shown, the drive circuit 250 includes a capacitor 258, a comparator 260, an OR gate 262, a latch 256, and a switch 270. Comparator 260 is coupled to receive the error signal $U_{ERR}$ 236 at its inverting input. The non-inverting input is coupled to one end of capacitor 258. The other end of capacitor 258 is coupled to input return 209 and the switch 270 is coupled across the capacitor 258.

In the example shown, the capacitor 258 is coupled to receive both the current sense signal 248, which is representative of the switch current (e.g., switch current $I_D$ 146), and the offset current $I_{OS}$ 244. Due to properties of the capacitor 258, the voltage across the capacitor 258 is substantially equal to the integral of the sum of the current sense signal 248 and the offset current $I_{OS}$ 244 divided by the value of the capacitor 258. In other words, the non-inverting input of the comparator 260 is coupled to receive a signal substantially equal to the integral of the sum of the current sense signal 248 and the offset current $I_{OS}$ 244 divided by the value of the capacitor 258.

As will be further discussed, the switching of switch 270 is controlled by a reset signal 272. The reset signal 272 may be voltage signal or a current signal. When the switch 270 is turned on, the capacitor 258 discharges through the switch 270 to input return 209 and the voltage across capacitor 258 may be reset to substantially zero voltage. Thus, it is appreciated that the switch 270 and capacitor 258 may function together as an integrator.

In the depicted example, inputs of OR gate 262 are coupled to receive the output of comparator 260 and the burst signal $U_{BURST}$ 240. The output of OR gate 262 is coupled to the latch 256. In one example, the latch 256 is a S-R latch and the output of OR gate 262 is coupled to reset latch 256 through the R-input of latch 256. In a further example, latch 256 is an R-dominant latch. In other words, in one example, when both the S-input and the R-input of latch 256 is a logic high value, the Q-output of the latch 256 is logic low. In one example, the latch 256 is coupled to be set in response to a clock signal 264, which is coupled to be received at the S-input of latch 256. Clock signal 264 may be a current signal or a voltage signal. In one example, the clock signal 264 is a rectangular pulse waveform with varying lengths of logic high and logic low sections and the time between rising edges is substantially equal to the switching period $T_S$ of the controller 200. It should be appreciated that the switching period $T_S$ of the controller 200 may be fixed or variable switching period T. In addition, the clock signal 264 may be provided from an oscillator or another circuit that determines when to turn on the power switch. The drive signal 252 is output from the Q-output of the latch 256.

In operation, the drive signal 252 transitions to a logic high value (and subsequently turning on the power switch) when the clock signal 264 transitions to a logic high value. The drive signal 252 transitions to a logic low value (and subsequently turning off the power switch) when the output of comparator 260 is logic high (and hence the output of OR gate 262 is logic high). In other words, the drive signal 252 transitions to a logic low value when the integral of the sum of the current sense signal 248 and the offset current $I_{OS}$ 244 divided by the value of the capacitor 258 is substantially equal to the error signal $U_{ERR}$ 236. The reset signal 272 may reset the capacitor 258 any time after the drive signal 252 transitions to a logic low value and before the start of the next switching period $T_S$.

When the error signal $U_{ERR}$ 236 is greater than the burst threshold 268, the output of comparator 266 is logic low and as such the output of the OR gate 262 is substantially equal to the output of comparator 260. However, when the error signal $U_{ERR}$ 236 is less than the burst threshold 268, indicating that the controller 200 should operate in burst mode control, the output of comparator 266 is logic high. As such, the output of OR gate 262 is logic high as long as the output of comparator 266 is logic high. The R-input of latch 256 is logic high and the Q-output (i.e., drive signal 252) is logic low. As such, when the error signal $U_{ERR}$ 236 is less than the burst threshold 268, controller 200 operates in a burst mode of operation and the power switch which is controlled in response to drive signal 252 is turned off.

In addition, the offset current $I_{OS}$ 244 is responsive to the error signal $U_{ERR}$ 236. As mentioned above, the offset current $I_{OS}$ 244 is substantially zero when the error signal $U_{ERR}$ 236 is greater than the first threshold $U_{TH1}$. As such, when the error signal $U_{ERR}$ 236 is greater than the first threshold $U_{TH1}$, the comparator receives the integral of the current sense signal 248, which is representative of the switch current $I_D$, divided by the value of capacitor 258. When the error signal $U_{ERR}$ 236 is less than the first threshold $U_{TH1}$, the offset current $I_{OS}$ 244 is substantially non-zero and the comparator receives the integral of the sum of the current sense signal 248 and the offset current $I_{OS}$ 244 divided by the value of capacitor 258. As such, in examples of the present disclosure, the controller 200 utilizes the error signal $U_{ERR}$ 236 to determine when to operate in burst mode control and magnitude of the offset current $I_{OS}$ 244 to reduce the noise susceptibility of the error signal $U_{ERR}$ 236 in accordance with the teachings of the present invention.

Figure 3A:
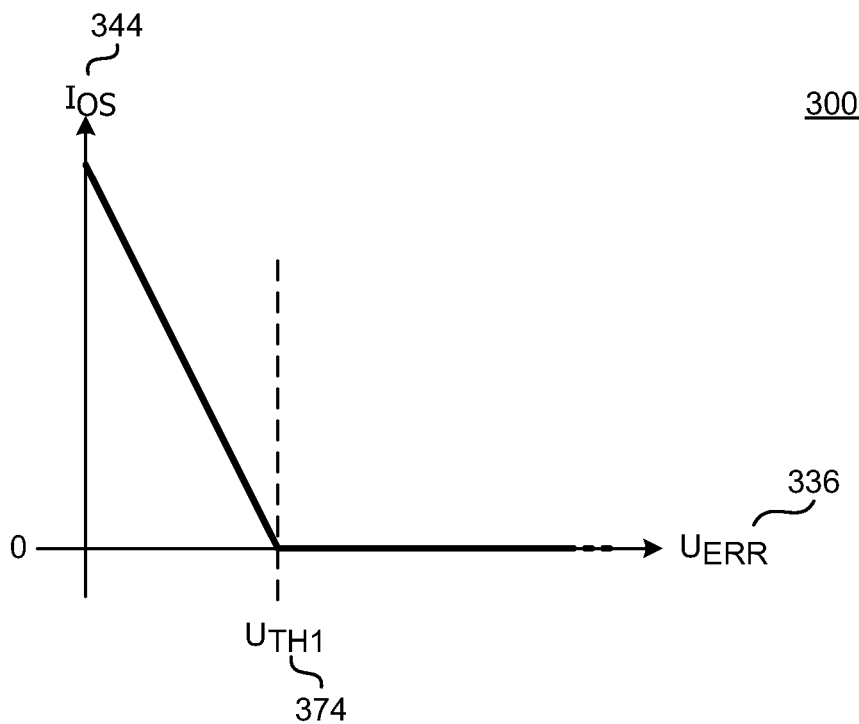
FIG. 3A is a graph illustrating one example relationship between the error signal and the offset signal in accordance with the teachings of the present invention.

FIG. 3A illustrates an example graph 300 illustrating an example relationship between the error signal $U_{ERR}$ 336 and the offset current $I_{OS}$ 344 in accordance with the teachings of the present invention. It should be appreciated that similarly named and numbered elements referenced below are coupled and function as described above. As illustrated, the offset current $I_{OS}$ 344 is substantially zero when the error signal $U_{ERR}$ 336 is greater than the first threshold $U_{TH1}$ 374. The offset current $I_{OS}$ 344 is substantially non-zero when the error signal is $U_{ERR}$ 336 is less the first threshold $U_{TH1}$ 374. In addition, the offset current $I_{OS}$ 344 increases as the error signal decreases from the first threshold $U_{TH1}$ 374 in the illustrated example. Although the example graph in FIG. 3A illustrates a linear relationship when the error signal is $U_{ERR}$ 336 is less the first threshold $U_{TH1}$ 374, it should be appreciated that the relationship may be non-linear. As mentioned above, the error signal $U_{ERR}$ 336 may be proportional to the load. In one example, the relationship between the load and error signal $U_{ERR}$ 336 is substantially linear for error signal $U_{ERR}$ 336 values greater than the first threshold $U_{TH1}$ 374. The relationship between the load and the error signal $U_{ERR}$ 336 becomes non-linear for error signal $U_{ERR}$ 336 values less than the first threshold $U_{TH1}$ 374 partially due to the added offset current $I_{OS}$ 374. In examples when the offset current generator is responsive to the input voltage sense signal, the rate at which the offset current $I_{OS}$ 344 increases may be dependent on the input voltage sense signal. In addition, in another example the magnitude of the first threshold $U_{TH1}$ 374 may be dependent on the value of the input voltage sense signal.

Figure 3B:
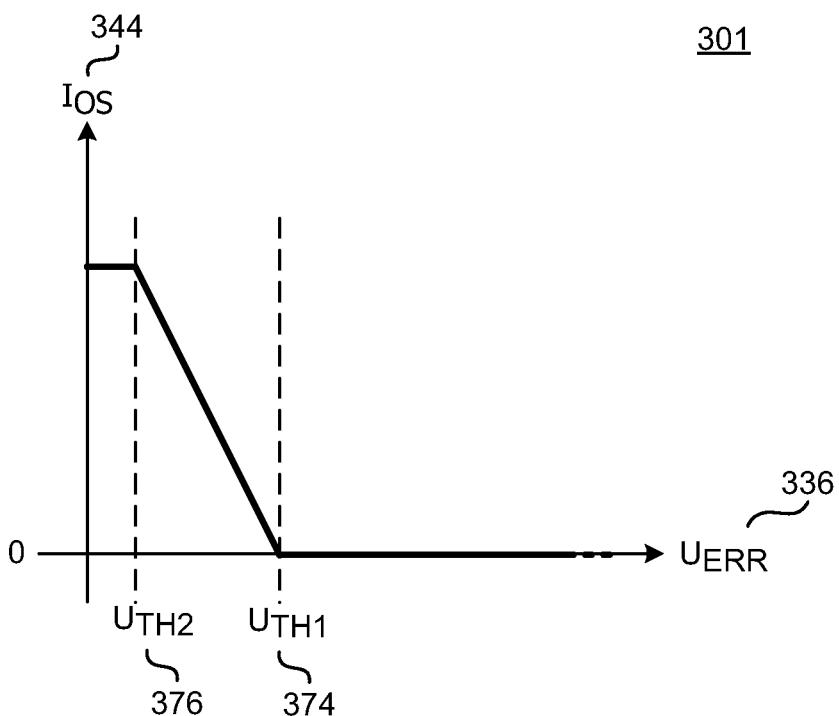
FIG. 3B is a graph illustrating another example relationship between the error signal and the offset signal in accordance with the teachings of the present invention.

FIG. 3B illustrates another example graph 301 illustrating an example relationship between the error signal $U_{ERR}$ 336 and the offset current $I_{OS}$ 344 in accordance with the teachings of the present invention. Graph 301 is similar to graph 300 described above, however when the error signal $U_{ERR}$ 336 is less than a second threshold $U_{TH2}$ 376, the offset current $I_{OS}$ 344 is substantially constant and equal to a non-zero value. In other words, example graph 301 illustrates an example in which the offset current $I_{OS}$ 344 may be a constant value for some value ranges of the error signal $U_{ERR}$ 336 (e.g., $U_{ERR}$ 336 is less than second threshold $U_{TH2}$ 376 or $U_{ERR}$ 336 greater than first threshold $U_{TH1}$ 374) while the offset current $I_{OS}$ 344 may be variable for other value ranges of the error signal $U_{ERR}$ 336 (e.g., $U_{ERR}$ 336 is greater than second threshold $U_{TH2}$ 376 and less than first threshold $U_{TH1}$ 374). In another example relationship between the error signal $U_{ERR}$ and the offset current $I_{OS}$ (not shown), the offset current $I_{OS}$ signal may be substantially constant for every value of the error signal $U_{ERR}$. In a further relationship between the error signal $U_{ERR}$ and the offset current $I_{OS}$ (not shown), offset current $I_{OS}$ signal may be a substantially non-zero constant when the error signal $U_{ERR}$ is less than the first threshold and may be substantially zero when the error signal $U_{ERR}$ is greater than the first threshold.

Figure 4:
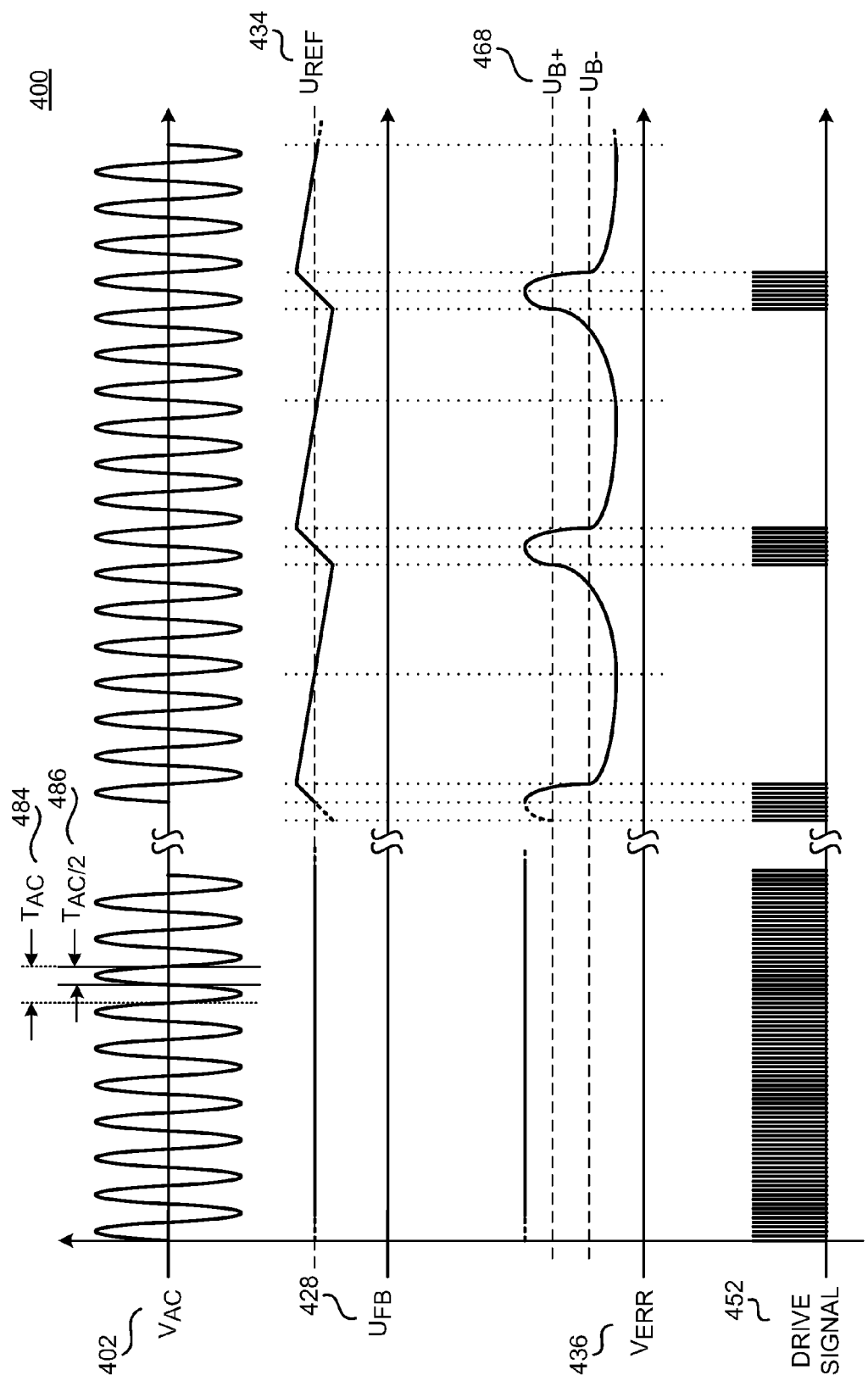
FIG. 4 is a timing diagram illustrating example various signals associated with FIG. 2, in accordance with the teachings of the present invention.

FIG. 4 illustrates a timing diagram 400 that illustrates various example waveforms of signals associated with the controller 200 shown in FIG. 2. It should be appreciated that similarly named and numbered elements below are coupled and function as described above. In the example shown in FIG. 4, the error signal 436 is depicted as a voltage signal and may be referred to as an error voltage $V_{ERR}$ 436. Referring back to FIG. 2, the load sensing circuit 232 may be a transconductance amplifier, which outputs a current in response to the difference between the signals received at the non-inverting input and inverting input (e.g., reference signal $U_{REF}$ and the feedback signal $U_{FB}$). The transconductance amplifier may sink or source current, depending on which received signal is greater. In one example when the error signal $U_{ERR}$ 236 is a voltage signal, the error voltage $V_{ERR}$ 436 is partially determined by the value of impedances of the components of the compensation network and the output current of the transconductance amplifier.

The left hand side of timing diagram 400 illustrates various example waveforms of the ac input voltage $V_{AC}$ 402, feedback signal $U_{FB}$ 428, error voltage $V_{ERR}$ 436, and the drive signal 452 for a high-load or full-load power condition. The ac input voltage $V_{AC}$ 402 is a sinusoidal waveform with a period referred to as a full line cycle $T_{AC}$ 484. The time between subsequent zero crossings of the ac input voltage $V_{AC}$ 402 may be referred to as a half line cycle $T_{AC/2}$ 486. As mentioned above, the time between rising edges of the drive signal 452 is substantially equal to the switching period $T_S$ of the controller. In the example shown in FIG. 4, the period of the ac input voltage $V_{AC}$ 402 (i.e., the full line cycle $T_{AC}$ 484) is greater than the switching period $T_S$ of the controller.

In the example shown, during high-load or full-load conditions, the feedback signal $U_{FB}$ 428 is substantially equal to the reference signal $U_{REF}$ 434. In one example, the load sensing circuit 232 may be a transconductance amplifier. If the feedback signal $U_{FB}$ 428 is substantially equal to the reference signal $U_{REF}$ 434, the current output of the transconductance amplifier is substantially zero. However, the voltage at the output of the transconductance amplifier (i.e., error voltage $V_{ERR}$ 436) is partially determined by the compensation network 254. For the example shown in FIG. 4, the error voltage $V_{ERR}$ 436 is non-zero. The transconductance amplifier outputs substantially zero current, and as such the error voltage $V_{ERR}$ 436 remains constant. In the example shown, error voltage $V_{ERR}$ 436 is greater than the burst threshold 468 (both the upper burst threshold $U_{B+}$ and the lower burst threshold $U_{B-}$). The output of the burst mode control circuit 238 is logic low and does not prevent the latch 256 from being set. As such, the drive circuit 238 may output the drive signal 452 in response to the clock signal 264 and the current sense signal 248. In the example of FIG. 4, the drive signal 452 is continuously switching from a logic high value to a logic low value.

The right hand side of the timing diagram 400 illustrates various example waveforms of the ac input voltage $V_{AC}$ 402, feedback signal $U_{FB}$ 428, error voltage $V_{ERR}$ 436, and the drive signal 452 for low-load or no-load power conditions and the controller enters burst mode. In the example shown, the feedback signal $U_{FB}$ 428 (which is representative of an output quantity $U_O$ of the power converter) oscillates around the reference signal $U_{REF}$ 434. For the example controller shown in FIG. 2, the transconductance amplifier sinks current when the feedback signal $U_{FB}$ 428 is greater than the reference signal $U_{REF}$ 434 and sources current when the feedback signal $U_{FB}$ 428 is less than the reference signal $U_{REF}$ 434. During burst mode, the controller provides output regulation by turning on and turning off the power switch for an interval of time (also referred to as a burst interval) followed by an interval of no switching. The right hand side of the timing diagram 400 illustrates the interval of switching (portion of time which the drive signal 452 transitions between a logic high and a logic low value) followed by an interval of no switching.

In the timing diagram of FIG. 4, when the feedback signal $U_{FB}$ 428 is greater than the reference signal $U_{REF}$ 434, the error voltage $V_{ERR}$ 436 is decreasing since the transconductance amplifier is sinking current from the compensation network. The rate of decrease of the error voltage $V_{ERR}$ 436 is faster when the difference between the feedback signal $U_{FB}$ 428 and the reference signal $U_{REF}$ 434 is greater. In the example shown, as the feedback signal $U_{FB}$ 428 increases, the error voltage $V_{ERR}$ 436 decreases. The error voltage $V_{ERR}$ 436 is greater than the burst threshold 468, specifically the lower burst threshold $U_{B-}$, and as such the output of the burst mode control circuit 238 is logic low and does not prevent the latch 256 from being set. In the example shown in FIG. 4, the drive signal 452 transitions between a logic high and a logic low value. When the error voltage $V_{ERR}$ 436 reaches the burst threshold 468, specifically the lower burst threshold $U_{B-}$, the output of the burst mode control circuit 238 transitions to a logic high value and prevents the latch from 256 from being set. In other words, the drive signal 452 is prevented from transitioning to a logic high value.

Once the drive signal 452 remains logic low and the power switch is prevented from turning on, the feedback signal $U_{FB}$ 428 begins to decrease. The error voltage $V_{ERR}$ 436 continues to decrease until the feedback signal $U_{FB}$ 428 reaches the reference signal $U_{REF}$ 434. In the timing diagram of FIG. 4, when the feedback signal $U_{FB}$ 428 is less than the reference signal $U_{REF}$ 434, the error voltage $V_{ERR}$ 436 is increasing since the transconductance amplifier is sourcing current from the compensation network. The rate at which the error voltage $V_{ERR}$ 436 increases is faster when the difference between the feedback signal $U_{FB}$ 428 and the reference signal $U_{REF}$ 434 is greater. In the example shown, when the error voltage $V_{ERR}$ 436 reaches the burst threshold 468, specifically the upper burst threshold $U_{B+}$, the output of the burst mode control circuit 238 transitions to a logic low value and the drive signal 452 can begin transitioning between a logic high and a logic low value. Once the drive signal 452 begins switching, the feedback signal $U_{FB}$ 428 increases and the error voltage $V_{ERR}$ 436 continues to increase until the feedback signal $U_{FB}$ 428 reaches the reference signal $U_{REF}$ 434.

Figure 5:
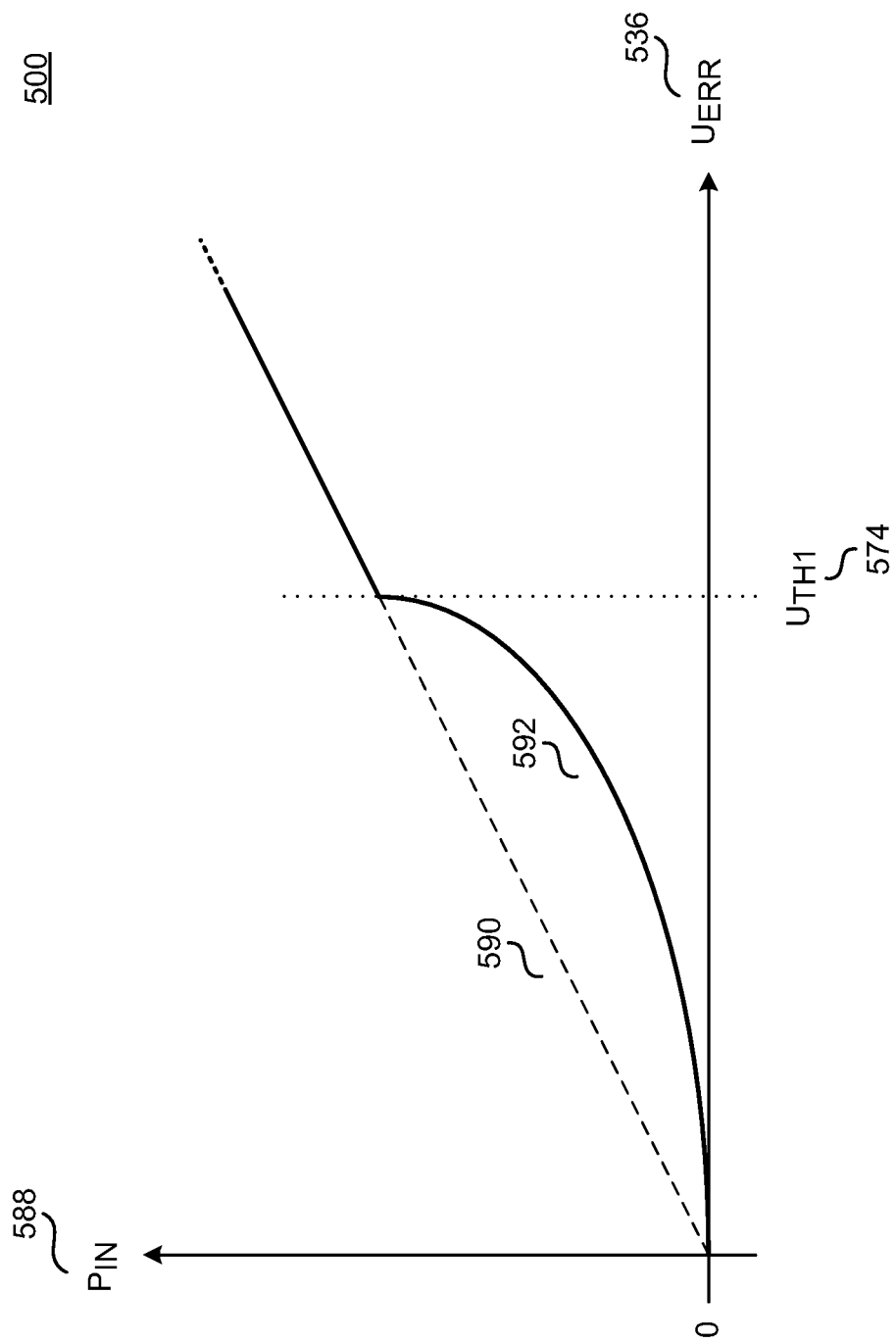
FIG. 5 is a graph illustrating one example relationship between the error signal and the input power of the power converter in accordance with the teachings of the present invention.

FIG. 5 illustrates a graph 500 illustrating one example relationship between the error signal $U_{ERR}$ 536 and input power $P_{IN}$ 588 of the power converter. As illustrated, in one example, there is a substantially linear relationship between input power $P_{IN}$ 588 and the error signal $U_{ERR}$ 536. In the example shown, the input power $P_{IN}$ 588 decreases as the error signal $U_{ERR}$ 536 decreases. The dashed line 590 illustrates the relationship between the input power $P_{IN}$ 588 and the error signal $U_{ERR}$ 536 without the use of burst mode and additional offset current. When the error signal $U_{ERR}$ 536 is less than the first threshold $U_{TH1}$ 574, the input power $P_{IN}$ 588 begins to decrease non-linearly as shown by the curved line 592. In the example shown, the curved line 592 decreases at a faster rate than the dashed line 590.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A controller for use in a power converter, comprising:
a load sensing circuit coupled to output an error signal in response to a feedback signal representative of an output of the power converter, wherein the error signal is proportional to a load coupled to an output of the power converter;
an offset current generator circuit coupled to output an offset current in response to the error signal;
a drive circuit coupled to control switching of a power switch to control a transfer of energy from an input of the power converter to the output of the power converter in response to the error signal, the offset current, and a current sense signal representative of a current through the power switch; and
a burst mode control circuit coupled to output a burst mode control signal in response to the error signal, wherein the drive circuit is further coupled to control switching of the power switch in response to the burst mode control signal, wherein the drive circuit includes a latch coupled to output a drive signal to control the switching of the power switch, wherein the latch is coupled to be set in response to a clock signal, wherein the latch is coupled to be reset in response to the error signal, the current sense signal and the offset current, and wherein the latch is coupled to be disabled from being set in response to the burst mode control signal.

2. The controller of claim 1, wherein the error voltage increases as the load increases.

3. The controller of claim 1 wherein the burst mode control circuit includes a burst mode comparator coupled to receive the error signal and a burst threshold, wherein the burst mode comparator is coupled to output the burst mode control signal in response to a comparison of the error signal and the burst threshold.

4. The controller of claim 3 wherein the burst mode control signal is coupled to cause the controller to operate in a burst mode of operation in response to the error signal falling below the burst threshold.

5. The controller of claim 3 wherein the burst mode comparator is coupled to provide a hysteretic comparison.

6. The controller of claim 1 wherein the drive circuit is coupled to output a drive signal to control the switching of the power switch, wherein the drive circuit is coupled to turn OFF the power switch in response to the error signal, the current sense signal and the offset current, and wherein the drive circuit is coupled to be disabled from switching the power switch in response to the burst mode control signal.

7. The controller of claim 1 wherein the latch is a reset dominant latch that is coupled to remain being reset during a burst mode of operation indicated by the burst mode control signal.

8. The controller of claim 1 wherein the latch is coupled to be reset in response to a comparison of the error signal and a sum of the current sense signal and the offset current.

9. The controller of claim 8 wherein the offset current is a substantially zero current if the error signal is greater than a first threshold and wherein the offset current is a non-zero current if the error signal is less than the first threshold.

10. The controller of claim 8 wherein the offset current is a substantially zero current if the error signal is greater than a first threshold and wherein the offset current increases from zero as the error signal decreases from the first threshold.

11. The controller of claim 8 further comprising a comparator having a first input coupled to be responsive to the error signal, the comparator having a second input coupled to be responsive to the sum of the current sense signal and the offset current, wherein the latch is coupled to be reset in response to an output of the comparator.

12. The controller of claim 11 further comprising an integrator circuit coupled to the second input of the comparator to integrate the sum of the current sense signal and the offset current.

13. The controller of claim 1 wherein the power converter comprises a power factor correction (PFC) converter.

14. The controller of claim 1, wherein the offset current generator circuit is further coupled to output the offset current in response to an input voltage signal.

15. A power converter, comprising:
an energy transfer element coupled between an input of the power converter and an output of the power converter;
a power switch coupled to the energy transfer element and to the input of the power converter; and
a controller coupled to output a drive signal to control switching of the power switch to control a transfer of energy from the input of the power converter to the output of the power converter, the controller including:
a load sensing circuit coupled to output an error signal in response to a feedback signal representative of the output of the power converter, wherein the error signal is proportional to a load coupled to an output of the power converter;
an offset current generator circuit coupled to output an offset current in response to the error signal;
a drive circuit coupled to output the drive signal in response to the error signal, the offset current, and a current sense signal representative of a current through the power switch; and
a burst mode control circuit coupled to output a burst mode control signal in response to the error signal, wherein the drive circuit is further coupled to control switching of the power switch in response to the burst mode control signal, wherein the drive circuit includes a latch coupled to output the drive signal, wherein the latch is coupled to be set in response to a clock signal, wherein the latch is coupled to be reset in response to the error signal, the current sense signal and the offset current, and wherein the latch is coupled to be disabled from being set in response to the burst mode control signal.

16. The power converter of claim 15 further comprising a rectifier circuit coupled to receive an alternating current (ac) input signal to output a rectified input signal coupled to be received by the energy transfer element.

17. The power converter of claim 15 wherein the power converter comprises a boost converter.

18. The power converter of claim 15 wherein the power converter comprises a power factor correction (PFC) converter.

19. The power converter of claim 15 further comprising a compensation circuit coupled to an output of the load sensing circuit.

20. The power converter of claim 15 wherein the burst mode control circuit includes a burst mode comparator coupled to receive the error signal and a burst threshold, wherein the burst mode comparator is coupled to output the burst mode control signal in response to a comparison of the error signal and the burst threshold.

21. The power converter of claim 20 wherein the burst mode control signal is coupled to cause the controller to operate in a burst mode of operation in response to the error signal falling below the burst threshold.

22. The power converter of claim 20 wherein the burst mode comparator is coupled to provide a hysteretic comparison.

23. The power converter of claim 15 wherein the drive circuit is coupled to output the drive signal, wherein the drive circuit is coupled to turn OFF the power switch in response to the error signal, the current sense signal and the offset current, and wherein the drive circuit is coupled to be disabled from switching the power switch in response to the burst mode control signal.

24. The power converter of claim 15, wherein the error voltage increases as the load increases.

25. The power converter of claim 15 wherein the latch is a reset dominant latch that is coupled to remain being reset during a burst mode of operation indicated by the burst mode control signal.

26. The power converter of claim 15 wherein the latch is coupled to be reset in response to a comparison of the error signal and a sum of the current sense signal and the offset current.

27. The power converter of claim 26 wherein the offset current is a substantially zero current if the error signal is greater than a first threshold and wherein the offset current is a non-zero current if the error signal is less than the first threshold.

28. The power converter of claim 26 wherein the offset current is a substantially zero current if the error signal is greater than a first threshold and wherein the offset current increases from zero as the error signal decreases from the first threshold.

29. The power converter of claim 26 further comprising a comparator having a first input coupled to be responsive to the error signal, the comparator having a second input coupled to be responsive to the sum of the current sense signal and the offset current, wherein the latch is coupled to be reset in response to an output of the comparator.

30. The power converter of claim 29 further comprising an integrator circuit coupled to the second input of the comparator to integrate the sum of the current sense signal and the offset current.

31. The power converter of claim 15, wherein the offset current generator circuit is further coupled to output the offset current in response to an input voltage signal.

* * * * *